(12) United States Patent
Nordlund

(10) Patent No.: US 6,890,148 B2
(45) Date of Patent: May 10, 2005

(54) TRANSITION DUCT COOLING SYSTEM

(75) Inventor: Raymond Scott Nordlund, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 20 days.

(21) Appl. No.: 10/650,954

(22) Filed: Aug. 28, 2003

(65) Prior Publication Data
US 2005/0047907 A1 Mar. 3, 2005

(51) Int. Cl.$^7$ .............................................. F03D 11/00
(52) U.S. Cl. ........................ 415/115; 415/176; 60/757; 60/800; 60/806
(58) Field of Search ........................ 415/115, 116, 175, 415/176; 60/752, 754, 756, 757, 800, 806, 60/796

(56) References Cited

U.S. PATENT DOCUMENTS

| 3,955,358 | A | 5/1976 | Martz et al. |
| 4,031,404 | A | 6/1977 | Martz et al. |
| 4,195,474 | A | * | 4/1980 | Bintz et al. ................... 60/730 |
| 4,498,288 | A | 2/1985 | Vogt |
| 5,261,225 | A | 11/1993 | Dickinson |
| 5,640,840 | A | 6/1997 | Briesch |
| 6,185,925 | B1 | 2/2001 | Proctor et al. |
| 6,195,979 | B1 | 3/2001 | Fukuyama |
| 6,351,938 | B1 | 3/2002 | Kerrebrock |
| 6,463,742 | B2 | 10/2002 | Mandai et al. |
| 6,484,505 | B1 | 11/2002 | Brown et al. |
| 6,532,744 | B1 | 3/2003 | Reiter et al. |

* cited by examiner

Primary Examiner—F. Daniel Lopez
Assistant Examiner—Dwayne White

(57) ABSTRACT

Aspects of the present invention relate to hollow elongated turbine engine components, such as transition ducts, having a cooling system. The component can have first and second ends, and can be defined by an outer peripheral wall. The cooling system extends longitudinally within the wall between the first and second ends. While configured to cool the entire component, the cooling system is particularly configured to reduce thermal gradients that can occur in regions proximate to the first and second ends of the component caused by higher loads in those regions. The cooling system can include at least one pair of cooling channels. Each channel pair includes a first channel and a second channel. The first and second channels can be arranged such that a coolant supplied to each channel can exchange heat with itself in at least the region substantially proximate to one of the ends.

20 Claims, 6 Drawing Sheets

TRANSITION DUCT COOLING SYSTEM

FIELD OF THE INVENTION

The invention relates in general to turbine engines and, more particularly, to transition ducts equipped with cooling systems.

BACKGROUND OF THE INVENTION

Referring to FIG. 1, a turbine engine generally comprises a compressor section (not shown), a combustor section 10 and a turbine section 12. A duct 14, also called a transition, extends between the combustor section 10 and the turbine section 12. The transition 14 serves many purposes. For example, the transition 14 can route hot gases produced in the combustor section 10 to the turbine section 12 of the engine. In addition, the transition 14 can act as a barrier between the compressor discharge air and the combustion gases.

However, during engine operation, combustion gases impart high thermal loads on the entire transition 14. One area in which thermal stress concentrations cause particular concern is near the outlet end 16 of the transition 14. The area near the outlet end 16 of the transition 14 tends to be exposed to higher loads compared to the rest of the transition 14 because of the geometry of the transition 14. For example, the transition 14 can have a smaller cross-sectional area at the outlet end 16 than in the upstream portion 18 of the transition 14.

Further, in some designs, the transition 14 may be contoured such that the flow has to make one or more turns before exiting the transition 14. Such configurations can restrict the flow of the combustion gases, which, in turn, can accelerate the flow of the combustion gases. These and other factors can result in high thermal loads occurring at the outlet end 16. Therefore, the transition 14 must be cooled in order for it to withstand such conditions.

Thus, one object according to aspects of the present invention is to provide a system for cooling a turbine engine component such as a transition. Another object according to aspects of the present invention is to reduce thermal gradients near the end regions of a turbine engine component caused by higher loads. Yet another object according to aspects of the present invention is to provide structural stiffness to the longitudinally central region of the turbine engine component. Still another object according to aspects of the present invention is minimize the constraints at the end regions of the turbine engine component. These and other objects according to aspects of the present invention are addressed below.

SUMMARY OF THE INVENTION

Aspects of the invention relate to a hollow elongated turbine engine component, such as a transition, having a first end and a second end. The component is defined by an outer peripheral wall. One or more pairs of cooling channels extend longitudinally within the outer peripheral wall between the first and second ends. Each pair of cooling channels includes a first channel and a second channel. The first and second channels can be substantially rectangular in cross-section, or they can be substantially semi-circular in cross-section.

The first channel begins in a longitudinally central region of the component and extends toward the second end of the component, thereby defining a first coolant supply leg. The first coolant supply leg transitions into a redirect leg, which reverses the direction of the first channel in a region substantially proximate to the second end such that the first channel extends back toward and terminates in the longitudinally central region, thereby defining a first coolant return leg. The redirect leg can be a substantially 180 degree turn. The first coolant supply leg is substantially adjacent to the first coolant return leg in at least the region substantially proximate to the second end. Further, the first coolant supply leg can be shorter than the first coolant return leg. The component can include coolant entry passages that can extend through the outer peripheral wall of the component and into the supply leg of the first channel or the supply leg of the second channel. Thus, a coolant supplied to the first channel can exchange heat with at least itself in at least the region substantially proximate to the second end.

The second channel begins in a longitudinally central region of the component and extends toward the first end of the component, thereby defining a second coolant supply leg. The second coolant supply leg transitions into a redirect leg, which reverses the direction of the second channel in a region substantially proximate to the first end such that the second channel extends back toward and terminates in the longitudinally central region, thereby defining a second coolant return leg. The redirect leg can be a substantially 180 degree turn. The second coolant supply leg is substantially adjacent to the second coolant return leg in at least the region substantially proximate to the first end. Further, the second coolant supply leg can be longer than the second coolant return leg. The component can include coolant exit passages that can extend between the outer peripheral wall of the component and the return leg of the first channel or the return leg of the second channel. Thus, a coolant supplied to the second channel can exchange heat with at least itself in at least the region substantially proximate to the first end.

At least a portion of the first coolant return leg is substantially adjacent to at least a portion of the second coolant supply leg such that heat transfer occurs between coolant in the first coolant return leg and coolant in the adjacent portions of the second coolant supply leg.

The first coolant supply leg can begin substantially proximate to the beginning of the second coolant supply leg. Further, both the first and second coolant supply legs can begin closer to the second end of the component. Similarly, the first coolant return leg can terminate substantially proximate to the ending of the second coolant return leg. Both the first and second coolant return legs can begin closer to the first end of the component.

In other aspects, the present invention relates to a cooled transition for a turbine engine. The transition includes an elongated tube having an inlet end and an outlet end. The tube is defined by an outer peripheral wall, and the tube can include one or more curves. The cross-sectional area of the tube at the outlet end can be smaller than the cross-sectional area of the tube at the inlet end. In one embodiment, the tube can be substantially circular at the inlet end and substantially rectangular outlet end.

A plurality of substantially peripherally adjacent cooling channel sets extend longitudinally through the wall of the tube between the inlet end and the outlet end. Each channel set includes a first channel and a second channel. The first and second channels can be substantially rectangular in cross-section.

The first channel begins in a longitudinally central region of the component and extends toward the outlet end of the tube, thereby defining a first coolant supply leg. The first coolant supply leg transitions into a redirect leg, which reverses the direction of the first channel in a region substantially proximate to the outlet end such that the first channel extends back toward and terminates in the longitudinally central region, thereby defining a first coolant return leg. The first coolant supply leg is substantially adjacent to the first coolant return leg in at least the region substantially proximate to the second end. Further, coolant entry passages can be provided that extend between the outer periphery of the tube and the supply portion of the first channel or the supply portion of the second channel. Thus, a coolant supplied to the first channel can exchange heat with at least itself in at least the region substantially proximate to the second end.

The second channel begins in a longitudinally central region of the component and extends toward the first end of the component, thereby defining a second coolant supply leg. The second coolant supply leg transitions into a redirect leg, which reverses the direction of the second channel in a region substantially proximate to the first end such that the second channel extends back toward and terminates in the longitudinally central region, thereby defining a second coolant return leg. The second coolant supply leg is substantially adjacent to the second coolant return leg in at least the region substantially proximate to the first end. Further, coolant exit passages can be provided that extend between the outer periphery of the tube and the return portion of the first channel or the return portion of the second channel. Thus, a coolant supplied to the second channel can exchange heat with at least itself in at least the region substantially proximate to the first end.

At least a portion of the first coolant return leg is substantially adjacent to at least a portion of the second coolant supply leg, allowing heat transfer to occur between a coolant in the first coolant return leg and a coolant in the adjacent portions of the second coolant supply leg.

The transition can further include a supply manifold and an exhaust manifold. The supply manifold can be secured to the outer periphery of the tube so as to enclose the coolant entry passages manifolds; the exhaust manifold can be secured to the outer periphery of the tube so as to enclose the coolant exit passages.

The plurality of cooling channel sets can be disposed in the wall of the tube such that supply legs and return legs alternate throughout the periphery of the tube. In one embodiment, the supply leg of the first and second channels can begin in a longitudinally central region of the tube, but closer to the outlet end of the tube. In addition, the return leg of the first and second channels can begin in a longitudinally central region of the tube but closer to the inlet end of the tube.

The transition tube can be formed by two or more longitudinal pieces panels. A longitudinal seam can be defined at each junction of the at least two panels. In such case, the cooling channel sets can be locally arranged such that the supply legs of the first and second channels are disposed on each side of the longitudinal seam.

DETAILED DESCRIPTION OF EMBODIMENTS OF THE INVENTION

Aspects of the present invention relate to a turbine engine component, such as a transition duct, incorporating a cooling system not only to cool the entire component generally, but also to minimize thermal gradients near the longitudinal ends of the component, especially near the outlet end.

Embodiments of the invention will be explained in the context of a transition duct for a turbine engine, but the detailed description is intended only as exemplary and can have application to any turbine engine component. Embodiments of the invention are shown in FIGS. 1–6, but the present invention is not limited to the illustrated structure or application.

Figure 2:
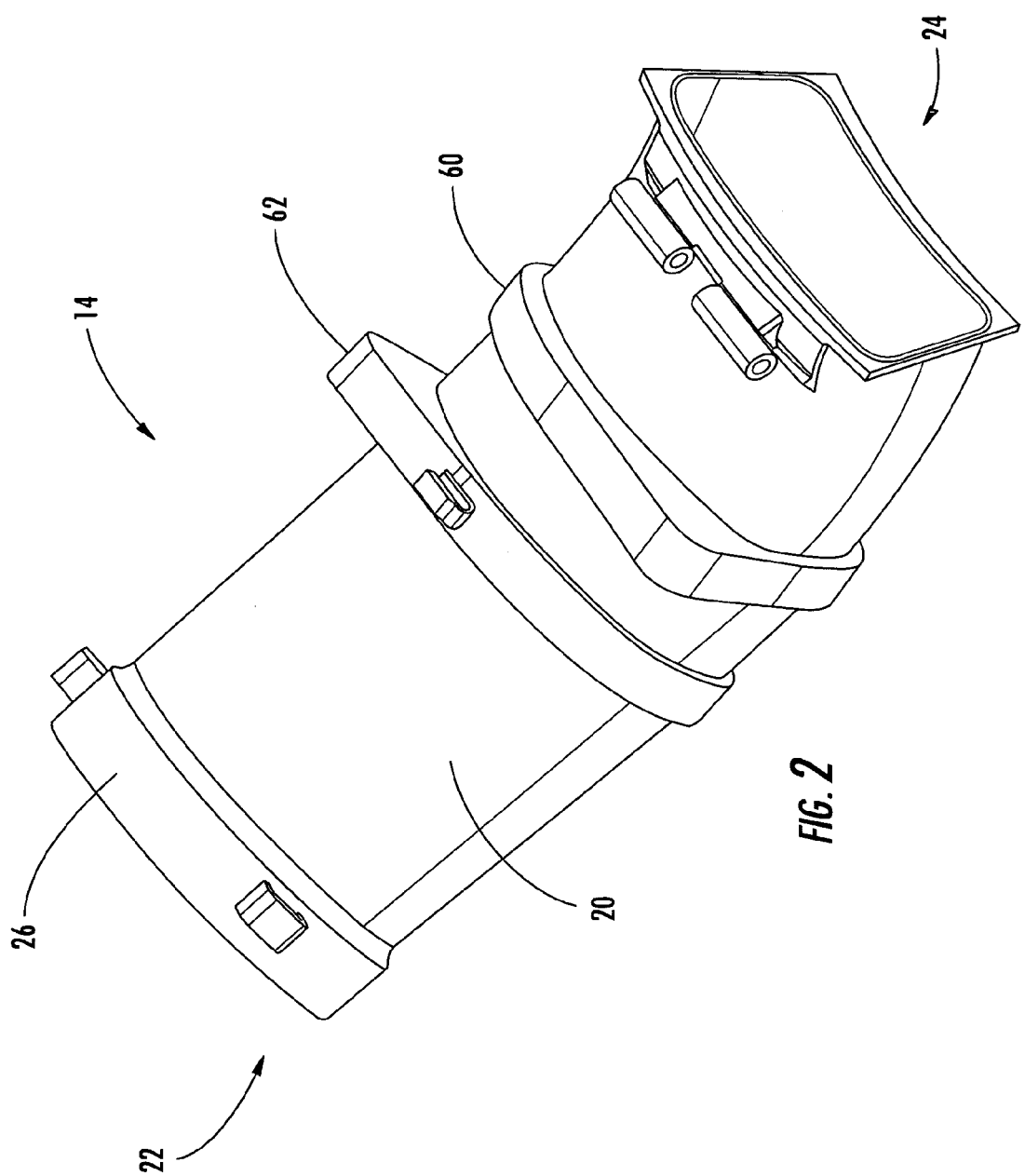
FIG. 2 is an isometric view of a transition duct according to aspects of the present invention.
Figure 3:
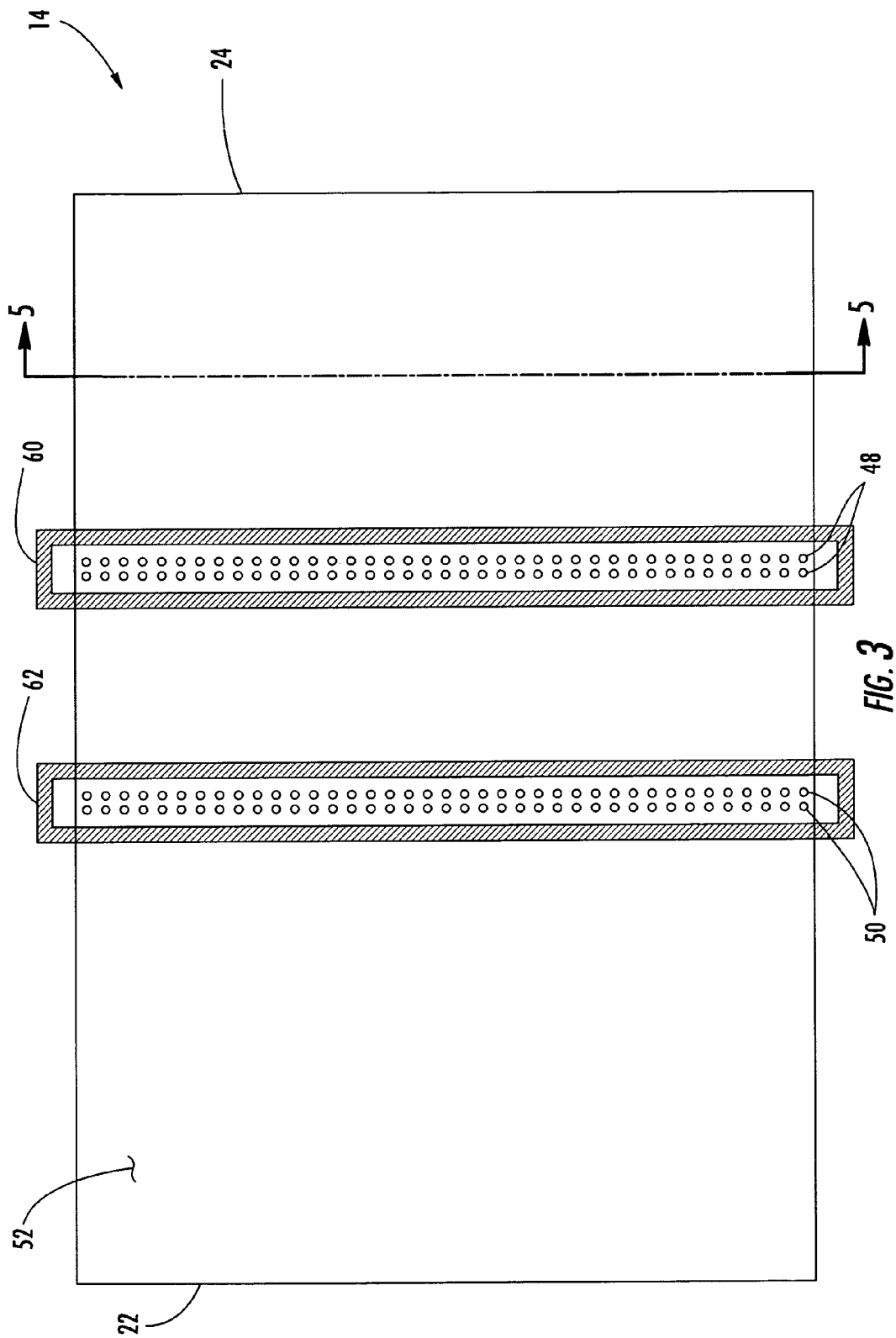
FIG. 3 is a partial cross-sectional view of a transition according to aspects of the present invention, showing the coolant entry and exit passages in the outer peripheral wall of the transition.
Figure 4:
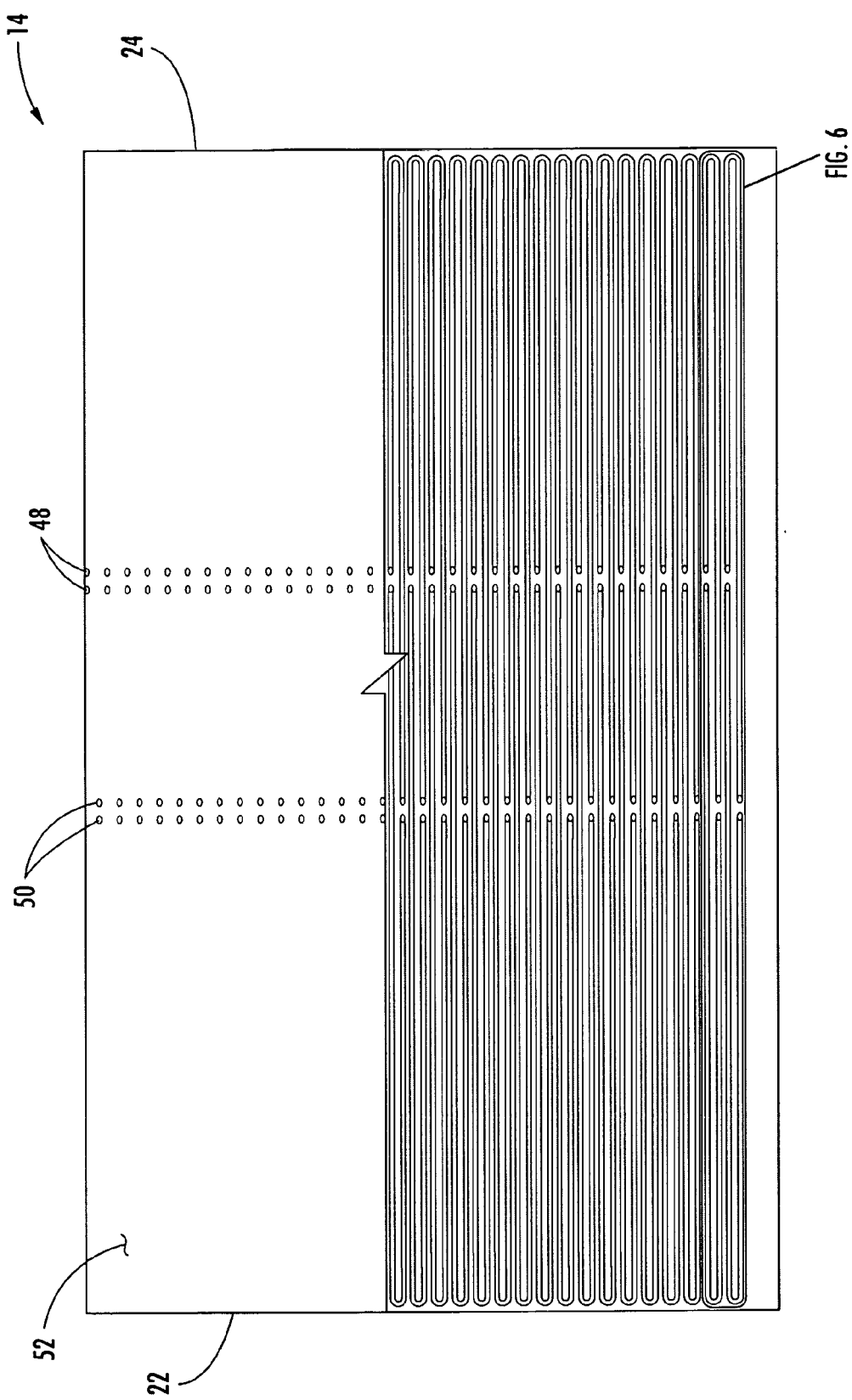
FIG. 4 is a partial cross-sectional view of a transition according to aspects of the present invention, showing a plurality of cooling channel pairs extending longitudinally within the transition between the inlet and outlet ends.
Figure 5:
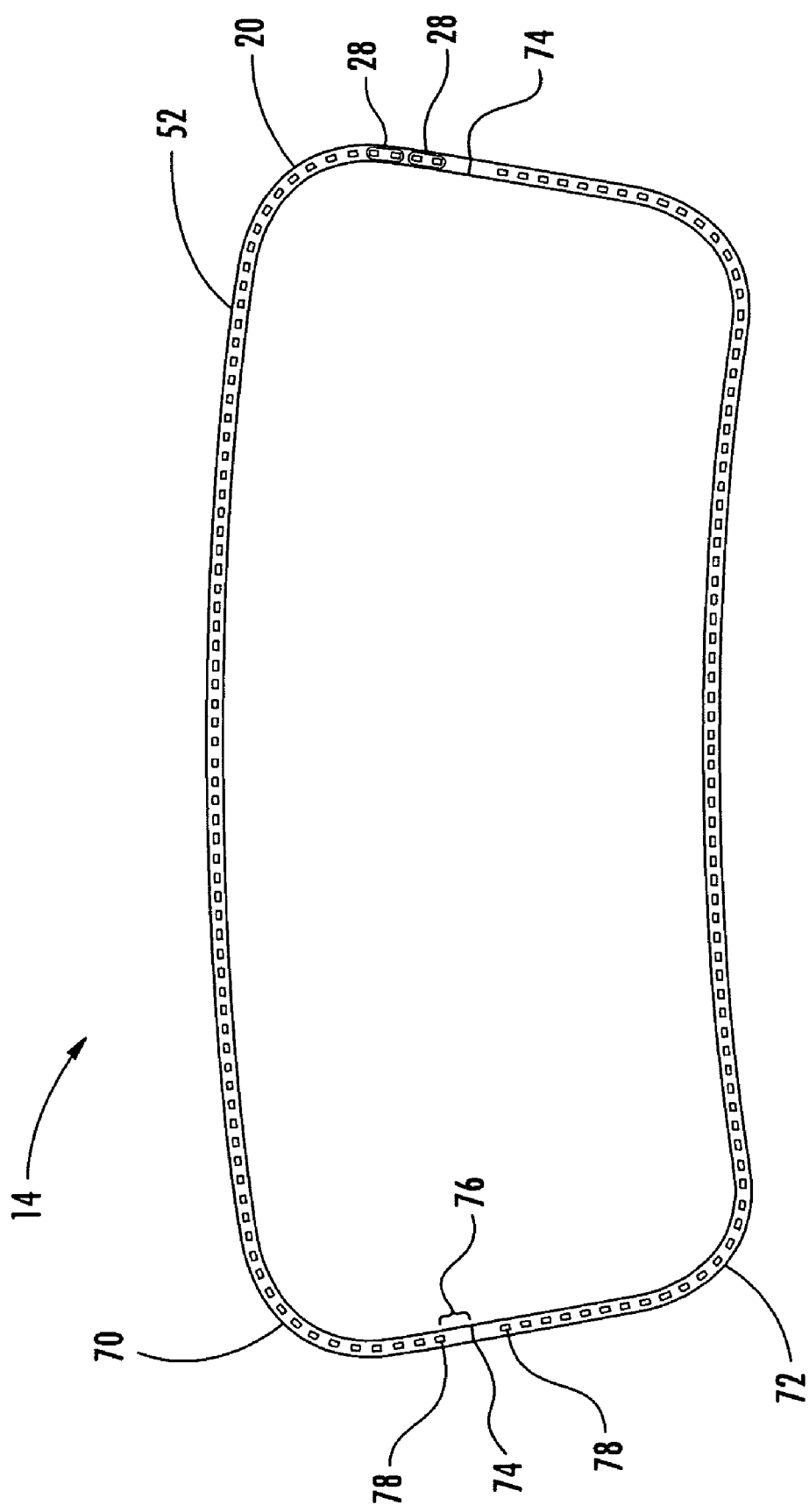
FIG. 5 is a cross-sectional view of a transition near the outlet end according to aspects of the present invention, taken along line 5—5 of FIG. 3, showing the cooling channels extending within and about the periphery of the outer wall of the transition.

As shown in FIG. 2, aspects of the present invention relate to a transition duct 14. The transition 14 can be generally elongated and hollow, either entirely or in part, such as in a localized area. Further, the transition 14 can be defined by an outer peripheral wall 20. Generally, the transition 14 can have two longitudinal ends such as an inlet end 22 and an outlet end 24, or, in the case of any turbine engine component, a first end 22 and a second end 24.

The transition 14 can be a tube having any of a number of configurations such as cylindrical, rectangular, trapezoidal, polygonal, to name a few. Further, the transition 14 can be substantially straight or it can have one or more contours such as curves, bends, tapers, and offsets. In light of these possibilities, when the term longitudinal is used herein, it is not intended to be limited to generally straight components or a single straight axis; rather, the term can embrace contoured components and/or a non-liner axis extending along the length of a component, such as a transition 14.

The cross-section geometry of the transition 14 can be any shape. The shape can remain substantially constant along the entire length of the transition 14. Alternatively, the cross-sectional geometry can vary from the inlet end 22 to the outlet end 24. For example, the inlet end 22 of the transition 14 can be substantially round and the outlet end 24 can be substantially rectangular. Likewise, the cross-sectional area of the transition 14 can vary between the inlet and outlet ends 22,24. For example, the inlet end 22 can have a larger cross-sectional area than the outlet end 24. Alternatively, the cross-sectional area may be substantially constant throughout.

Aside from its outer peripheral wall 20, the transition 14 can include other attachments, structures or supports including, for example, an inlet ring 26, which may or may not be configured according to aspects of the invention.

In order to cool the transition 14, at least one pair of cooling channels 28 can be provided within the outer peripheral wall 20 of the transition 14, extending longitudinally between the inlet and outlet ends 22,24. Each pair of channels 28 can include a first channel 30 and a second channel 32.

The first channel 30 begins in a longitudinally central region 33 of the transition 14 and extends toward the outlet end 24 of the transition 14 to thereby define a first coolant supply leg 34. The longitudinally central region 33 can be any region of the transition except for the inlet and outlet ends 22,24 as well as a region substantially proximate thereto.

The first coolant supply leg 34 transitions into a redirect leg segment 36, which reverses the direction of the first channel 30. The redirect leg 36 can be generally situated in a region substantially proximate to the outlet or second end 24. From the redirect leg 36, the first channel 30 extends back toward the longitudinally central region 33 and ultimately terminates in this region 33 as well. This segment of the first channel 30 defines a first coolant return leg 38. The first channel 30 can be arranged such that the first coolant supply leg 34 is substantially adjacent to the first coolant return leg 38 in at least the region substantially proximate to the outlet end 24. As a result, when a coolant is passed through the first channel 30, the coolant can exchange heat with itself and possibly other channels, such as the redirect portion of a neighboring channel pair 28, at least in the region substantially proximate to the outlet end 24.

The second channel 32 begins in the longitudinally central region 33 of the transition 14 and extends toward the first or inlet end 22 of the transition 14 to thereby define a second coolant supply leg 40. In a region substantially proximate to the inlet end 22, the second coolant supply leg 40 transitions into a redirect leg 42, which reverses the direction of the second channel 32 so that the second channel 32 extends back toward and ultimately terminates in the longitudinally central region 33 to define a second coolant return leg 44. The second coolant supply leg 40 is substantially adjacent to the second coolant return leg 44 in at least the region substantially proximate to the inlet end 22, allowing a coolant supplied to the second channel 32 to transfer heat with at least itself in the region substantially proximate to the inlet end 22.

At least a portion of the first coolant return leg 38 can be substantially adjacent to at least a portion of the second coolant supply leg 40. The nearness of these portions of the first and second channels 30,32 allows heat transfer to occur between the first and second channels 30,32. The term "substantially adjacent" means that the first and second channels 30,32 are disposed close enough to achieve the desired heat transfer effect. Substantially adjacent includes a spacing 46 between the neighboring channels whether they are channels 30,32 belonging to the same channel pair 28 or they are channels 30,32 belonging to different channel pairs 28. The spacing 46 between the channels to achieve the desired cooling can be based on a number of factors including, for example, anticipated thermal loads, the length of the channels and the thickness of the component wall through which the channels extend.

The first and second channels 30,32 can have any of a variety of cross-sectional geometries. For example, the first and second channels 30,32 can be substantially rectangular, parallelogram, semi-circular, semi-polygonal, or trapezoidal. The term substantially used in connection with any of these shapes includes the true shape and deviations therefrom. For example, a substantially rectangular channel can include a true 90 degree corner as well as a rounded corner. Preferably, the first and second channels 30,32 have substantially identical cross-sectional geometries, but they can have different geometries. For example, the first channel 30 can be generally rectangular and the second channel 32 can be semi-circular. In a similar manner, the geometry of neighboring pairs of channels 28 can be identical or dissimilar.

Further, the first coolant supply leg 34 can begin in an area 30a substantially proximate to an area 32a in which the second coolant supply leg 40 begins. Similarly, the first coolant return leg 38 can terminate in an area 30b substantially proximate to an area 32b in which the second coolant return leg 44 ends.

Both the first and second coolant supply legs 34,40, while generally located in a longitudinally central region 33, can begin closer to the exit end 24 of the transition 14. Similarly, the first and second coolant return legs 38,44 can terminate closer to the inlet end of the transition 14. In such case, the first coolant supply leg 34 is shorter than the first coolant return leg 38, and the second coolant supply leg 40 is longer than the second coolant return leg 44. Such an arrangement can be beneficial because coolant entering the supply leg 34 reaches the outlet end 24 of the transition 14 quicker than coolant entering the supply leg 40 reaches the inlet end 22 of the transition 14. This is significant because, as noted earlier, the outlet end 24 of the transition 14 is where the largest thermal loads are imparted on the transition 14. Thus, supplying relatively cooler coolant to the outlet end 24 helps to better counteract the large thermal loads.

For each pair of channels 28, the first and second coolant supply legs 34,40 can be collectively referred to as the supply side channels, and the first and second return legs 38,44 can be collectively referred to as the return side channels.

The redirect legs 36,42 can have any of a variety of configurations. For example, each of the redirect legs 36,42 can be a substantially 180 degree turn. In such case, the redirect legs 36,42 can be generally unshaped including a parabolic or rectilinear shaped pathway. The redirect legs 36,42 can, but need not, be identical. Further, the redirect legs 36,42 are not necessarily a discernable portion of the first and second channels 30,32. That is, the redirect legs 36,42 are formed by the meeting of the supply legs 34,40 and the return legs 38,44 in a region substantially proximate to the ends 22,24 of the transition 14. Thus, each redirect leg 36,42 comprises a portion a supply leg 34,40 and a return leg 38,44 for each channel 30,32.

The transition 14 can include coolant entry and exit passages 48, 50 so that a coolant, such as air or steam or other fluid, can be introduced into or discharged from the first and second cooling channels 30,32. In one embodiment, the coolant entry passages 50 extend between the exterior surface 52 of the outer peripheral wall 20 of the transition 14 and the supply legs 34,40 of the first and second channels 30,32, preferably at the beginning 30a,32a of each coolant supply leg 34,40. Similarly, the coolant exit passages 50 can extend between the exterior surface 52 of the outer peripheral wall 20 of the transition 14 and the return legs 38,44 of the first and second channels 30,32 such as at the endings 30b,32b of each return leg 38,44. The coolant entry passages 48 and the coolant exit passages 50 can extend generally radially outward from the supply legs 34,40 of the first and second channels 30,32 such that they are substantially orthogonal to the channels 30,32. Alternatively, the coolant entry and exit passages 48,50 may extend radially outward at an oblique angle with respect to the supply legs 34,40 of the first and second channels 30,32.

The above discussion relates to a single pair of cooling channels 28 that cooperate to cool the transition 14. However, there can be a plurality of peripherally adjacent cooling channel pairs 28 within the outer peripheral wall 20 of the transition. The channel pairs 28 can be positioned such that they are substantially adjacent to neighboring channel pairs 28. Thus, any given channel can be bounded on one side by the channel with which it is paired and, on the other side, by a channel from another adjacent channel pair 28. In one embodiment, the channels pairs 28 can be arranged such that the supply side channels alternate with the return side channels throughout the periphery of the transition tube 14.

A transition according to aspects of the present invention can further include a supply manifold 60 and an exhaust manifold 62. The supply manifold 60 can be secured, such as by welding or brazing, about the exterior surface 52 of the outer peripheral wall 20 of the transition tube 14 so as to substantially enclose the coolant entry passages 48. Similarly, the exhaust manifold 62 can be secured to the outer peripheral wall 20 of the transition tube 14 so as to substantially enclose the coolant exit passages 50. As noted earlier, both the coolant entry passages 48 and coolant exit passages 50 are located in a substantially longitudinally central region 33 of the transition tube 14. When secured in place, the manifolds 60,62 can increase the stiffness of the transition 14 at least in a portion of the longitudinally central region 33. Thus, this region 33 of the transition 14 can better manage the acoustic and vibratory dynamic combustion forces that can impinge on the transition 14. Further, the longitudinally central positioning of the manifolds 60,62 can reduce the number of constraints on the inlet and exhaust ends 22,24 of the transition 14 so as to allow for some thermal expansion at the ends 22,24 of the transition, especially at the exit end 24.

Figure 1:
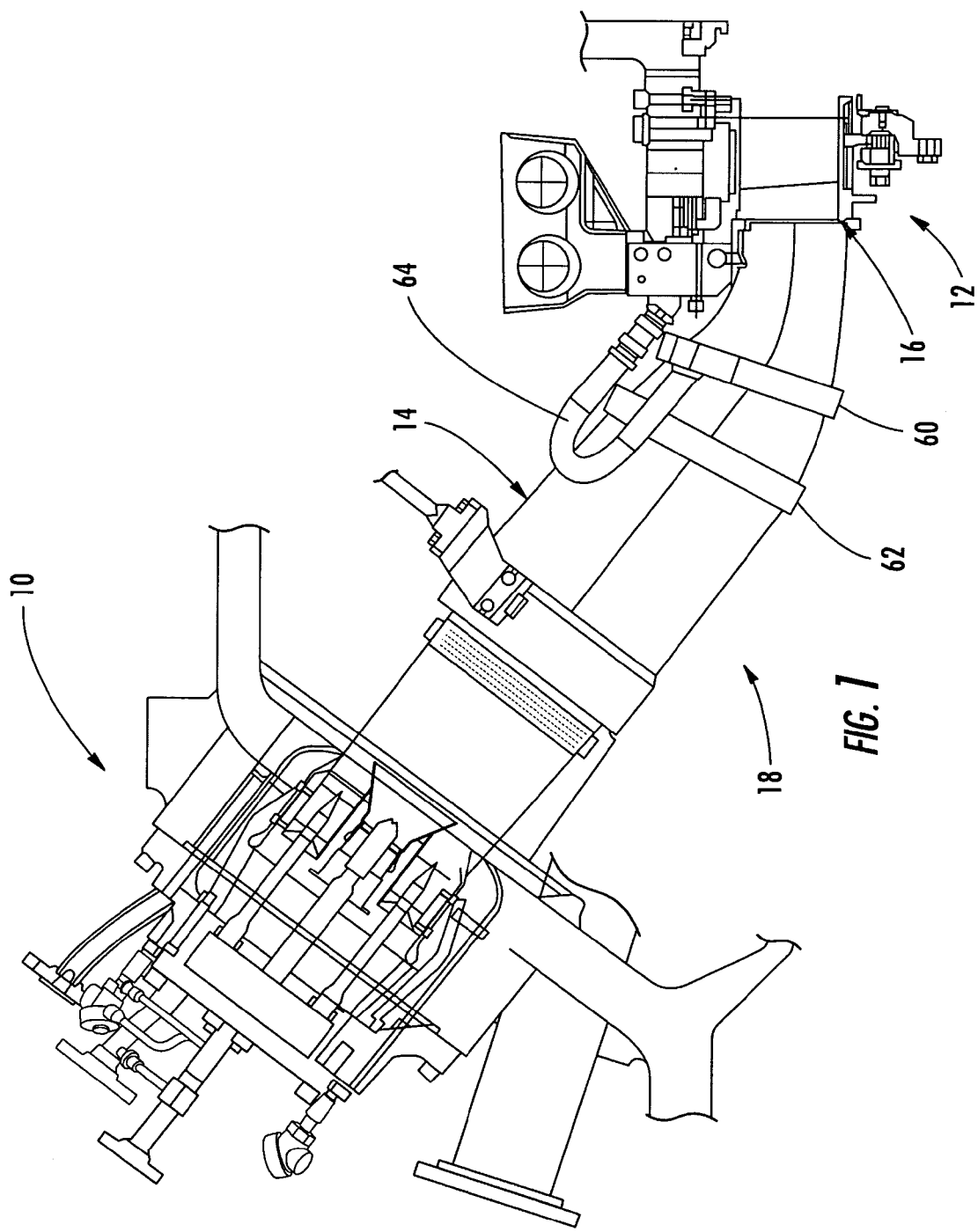
FIG. 1 is a cross-sectional view through a portion of a turbine engine.

The manifolds 60,62 can have any of a number of configurations. In one embodiment, the manifolds 60,62 are generally hollow. As shown in FIG. 1, the supply and exhaust manifolds 60,62 can be adapted for connection to a coolant supply line 64, such as a hose or pipe. For example, the manifolds 60,62 can include one or more openings, fittings or couplings. The supply and exhaust manifolds 60,62 can be substantially identical components or they may be unique individual components. The manifolds 60,62 can be made of any material capable of withstanding the turbine engine environment and, in one embodiment, the manifolds 60,62 are made of the same material as the transition 14. Because the manifolds 60,62 peripherally surround the transition 14, each manifold 60,62 can be made of two or more pieces.

Having described the various components, one manner of making or assembling a transition 14 according to aspects of the invention will now be described. In one embodiment, the transition 14 or other turbine engine component can be created as a single piece with the desired features and cooling channels 30,32 cast in the part. In other embodiments, the transition 14 or turbine engine component can be an assembly of two or more longitudinal sub-panels. A transition 14 that is made of two sub-panels—an upper sub-panel 70 and a lower sub-panel 72—will be discussed as an example.

Each sub-panel 70,72 can be made of a sandwich of two substantially flat metal sheets made from materials such as Inconel 617 or Haynes 230. In one of the sheets, one or more pairs of cooling channels 28 can be added in any of a variety of manners such as by casting, waterjet, EDM, ECM, or any conventional machining operations, such as milling. The other substantially flat sheet can remain unaltered and then is subsequently joined to the sheet having the cooling channel pairs. In another embodiment, both sheets can have desired features included and then subsequently joined. After a sub-panel is formed, the desired contours of the transition 14 can be formed in a dye.

When two longitudinal sub-panels 70,72 are used to create the transition 14, the sub-panels 70,72 can be brought together and joined, by any of variety of processes, along the longitudinal seams 74. For example, the sub-panels 70,72 can be welded together along the longitudinal seams 74 formed at the junctions between the sub-panels 70,72. In order to have a sufficient welding area and to minimize distortion to the cooling channels, there must be a sufficient distance 76 between the channel edge and the weld seam. However, the distance 76 can be greater than the typical spacing between the channels 30, 32. Thus, to provide adequate cooling along the weld split line, the cooling channel pairs 28 can be arranged, locally or otherwise, such that the supply side legs of the neighboring channel pairs 78 face the longitudinal seam 74. Thus, the relatively cooler supply side legs of the channels can provide cooling to the area around the longitudinal seam 74.

Once the transition 14 having the desired cooling channel pairs 28 is formed, the manifolds 60,62 can be secured to the outer peripheral wall 20 of the transition 14 by welding or brazing.

Figure 6:
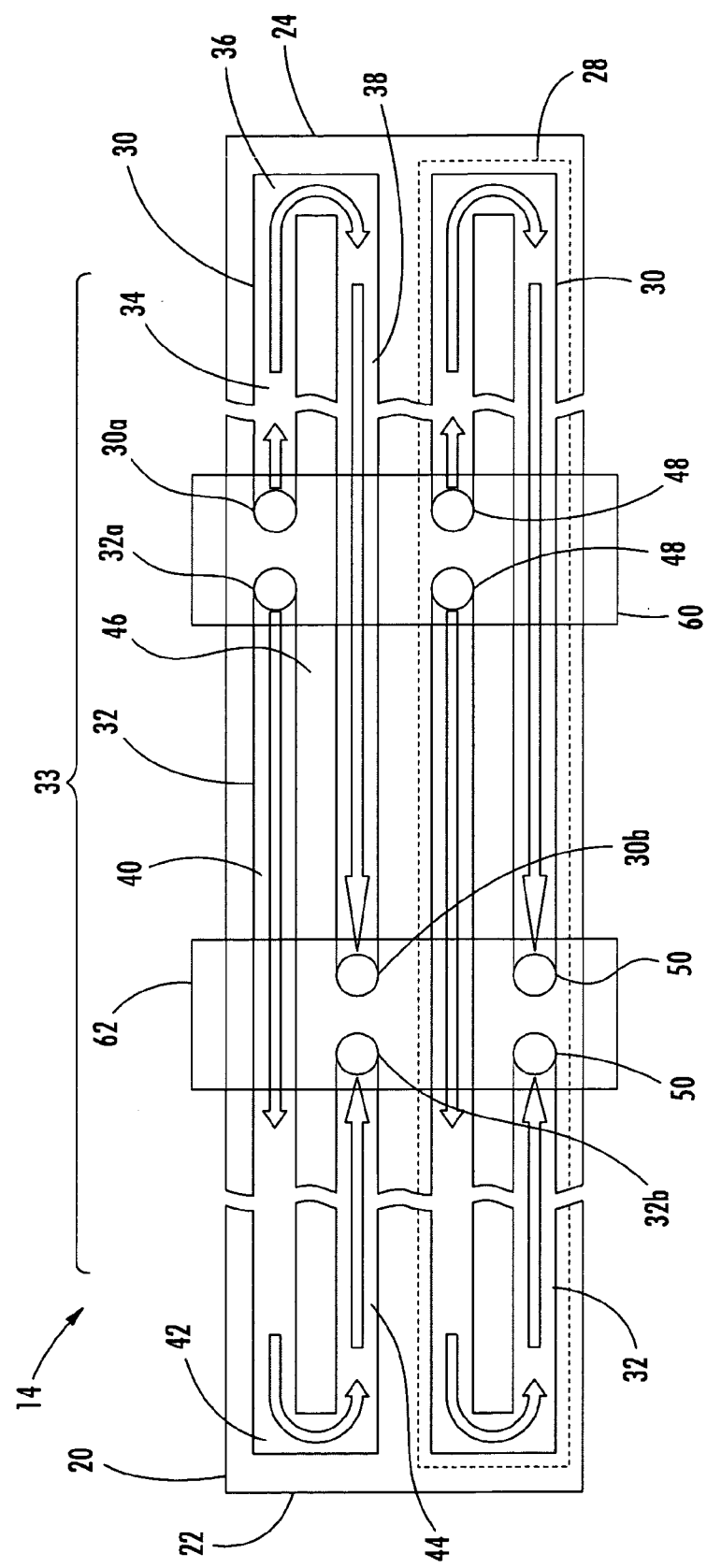
FIG. 6 is close-up view of two adjacent cooling channel pairs according to aspects of the present invention.

Turning to FIG. 6, one manner of using a transition 14 according to aspects of the invention will now be described. Again, during engine operation, the transition 14 is exposed to high thermal loads. To counter these loads, a coolant can be supplied to the supply manifold 60. Any coolant can be used to cool the transition 14. For example, the coolant can be steam. The steam can come from a boiler or, in a combined cycle power generation system, the source of the steam can be a steam turbine. In addition to steam, the coolant can be air. The air can be compressor discharge air that is bled off of the compressed air flowing between the compressor and the combustor section of the turbine. Alternatively, the air can be pumped directly to the transition 14 by way of an auxiliary compressor. Again, any coolant can be used so long as it can effectively cool the transition 14.

Regardless of the specific coolant employed, coolant can flow into the supply manifold 60. Once inside, the only path for the coolant to flow is into the entry passages 48 and into the supply legs 34,40 of the first and second channels 30,32. In each first channel 30, the coolant flows through the supply leg 34, the redirect leg 36 and the return leg 38, and then exits through the exit passage 50. In each second channel 32, the coolant flows through the supply leg 40, the redirect leg 42 and the return leg 44, and then exits through the exit passage 50. After passing through the exit passages 50, the coolant enters the exhaust manifold 62. When steam is used as the coolant it can be exhausted by a pipe (not shown) out of the exhaust manifold 62 and returned to some point in the steam turbine cycle. On the other hand, air can be dumped into the exhaust of the turbine, or back into the combustor shell.

The coolant in the channels can exchange heat with neighboring channels such as between a portion of the supply leg 40 of the second channel 32 and a portion of the return leg 38 of the first channel 30. Also, heat transfer can occur between the supply side channels of one channel pair 28 and the return side channels of another channel pair 28. Significantly, the coolant exchanges heat with itself in the regions substantially proximate to the longitudinal ends 22,24 of the transition 14. This arrangement reduces thermal gradients at the ends of the transition 14, especially at the outlet end 24, by making the temperature of the transition substantially uniform at the ends 22,24. The arrangement further reduces thermal gradients by limiting coolant temperature rise due to transfer of heat from hot to cold channels.

It will of course be understood that the invention is not limited to the specific details described herein, which are given by way of example only, and that various modifications and alterations are possible within the scope of the invention as defined in the following claims.

What is claimed is:

1. A turbine engine component comprising:
   an elongated hollow turbine engine component having a first end and a second end, the component defined by an outer peripheral wall;
   at least one pair of cooling channels extending longitudinally within the outer peripheral wall between the first and second ends, the at least one pair of cooling channels including a first channel and a second channel;
   the first channel beginning in a longitudinally central region of the component and extending toward the second end of the component thereby defining a first coolant supply leg, the first coolant supply leg transitioning into a redirect leg wherein the first channel reverses direction in a region substantially proximate to the second end so as to extend back toward and terminate in the longitudinally central region thereby defining a first coolant return leg, wherein the first coolant supply leg is substantially adjacent to the first coolant return leg in at least the region substantially proximate to the second end, whereby a coolant supplied to the first channel exchanges heat with at least itself in at least the region substantially proximate to the second end;
   the second channel beginning in a longitudinally central region of the component and extending toward the first end of the component thereby defining a second coolant supply leg, the second coolant supply leg transitioning into a redirect leg wherein the second channel reverses direction in a region substantially proximate to the first end so as to extend back toward and terminate in the longitudinally central region thereby defining a second coolant return leg, wherein the second coolant supply leg is substantially adjacent to the second coolant return leg in at least the region substantially proximate to the first end, whereby a coolant supplied to the second channel exchanges heat with at least itself in at least the region substantially proximate to the first end;
   wherein at least a portion of the first coolant return leg is substantially adjacent to at least a portion of the second coolant supply leg, whereby heat transfer occurs between a coolant in the first coolant return leg and coolant in the adjacent portions of the second coolant supply leg.

2. The component of claim 1 wherein the component includes coolant entry and exit passages, the coolant entry passages extending through the outer peripheral wall of the component and into the supply leg of the first and second channels, the coolant exit passages extending between the outer peripheral wall of the component and the return leg of the first and second channels.

3. The component of claim 1 wherein the first coolant supply leg begins substantially proximate to the beginning of the second coolant supply leg, both the first and second coolant supply legs begin closer to the second end of the component.

4. The component of claim 1 wherein the first coolant return leg terminates substantially proximate to the ending of the second coolant return leg, both the first and second coolant return legs begin closer to the first end of the component.

5. The component of claim 1 wherein the first and second channels are substantially rectangular in cross-section.

6. The component of claim 1 wherein the first and second channels are substantially semi-circular in cross-section.

7. The component of claim 1 wherein the first coolant supply leg is shorter than the first coolant return leg, the second coolant supply leg is longer than the second coolant return leg.

8. The turbine engine component of claim 1 wherein the turbine engine component is a transition.

9. The turbine engine component of claim 1 wherein the first and second redirect legs are substantially 180 degree turns.

10. A cooled transition for a turbine engine comprising:
    an elongated tube having an inlet end and an outlet end, the tube defined by an outer peripheral wall;
    a plurality of substantially peripherally adjacent cooling channel sets extending longitudinally within the wall of the tube between the inlet end and the outlet end, each channel set including a first channel and a second channel;
    the first channel beginning in a longitudinally central region of the tube and extending toward the outlet end of the tube thereby defining a first coolant supply leg, the first coolant supply leg transitioning into a redirect leg wherein the first channel reverses direction in a region substantially proximate to the outlet end so as to extend back toward and terminate in the longitudinally central region thereby defining a first coolant return leg, wherein the first coolant supply leg is substantially adjacent to the first coolant return leg in at least the region substantially proximate to the outlet end, whereby a coolant supplied to the first channel exchanges heat with at least itself in at least the region substantially proximate to the outlet end;
    the second channel beginning in a longitudinally central region of the tube and extending toward the first end of the tube thereby defining a second coolant supply leg, the second coolant supply leg transitioning into a redirect leg wherein the second channel reverses direction in a region substantially proximate to the inlet end so as to extend back toward and terminate in the longitudinally central region thereby defining a second coolant return leg, wherein the second coolant supply leg is substantially adjacent to the second coolant return leg in at least the region substantially proximate to the inlet end, whereby a coolant supplied to the second channel exchanges heat with at least itself in at least the region substantially proximate to the inlet end;
    wherein at least a portion of the first coolant return leg is substantially adjacent to at least a portion of the second coolant supply leg, whereby heat transfer occurs between a coolant in the first coolant return leg and a coolant in the adjacent portions of the second coolant supply leg.

11. The transition of claim 10 wherein the tube includes coolant entry and exit passages, the coolant entry passages extending between the outer periphery of the tube and the supply leg of the first and second channels, the coolant exit passages extending between the outer periphery of the tube and the return leg of the first and second channels.

12. The transition of claim 11 further including a supply manifold and an exhaust manifold, wherein the supply manifold is secured to the outer periphery of the tube so as to enclose the coolant entry passages, the exhaust manifold is secured to the outer periphery of the tube so as to enclose the coolant exit passages.

13. The turbine engine component of claim 10 wherein the supply leg of the first channel and the supply leg of the second channel begin in a longitudinally central region of the tube but closer to the outlet end of the tube, and the return leg of the first channel and the return leg of the second channel begin in a longitudinally central region of the tube but closer to the inlet end of the tube.

14. The turbine engine component of claim 10 wherein the plurality of cooling channel sets are disposed in the wall of the tube such that supply legs and return legs alternate throughout the periphery of the tube.

15. The turbine engine component of claim 10 wherein the first and second channels are substantially rectangular in cross-section.

16. The transition of claim 11 wherein the tube is formed by at least two longitudinal panels, wherein a longitudinal seam is defined at each junction of the at least two panels.

17. The transition of claim 16 wherein the cooling channel sets are locally arranged such that the supply legs of the first and second channels are disposed on each side of the longitudinal seam.

18. The transition of claim 10 wherein the tube has a substantially circular at the inlet end and substantially rectangular outlet end.

19. The turbine engine component of claim 10 wherein the cross-sectional area of the tube at the outlet end is less than the cross-sectional area of the tube at the inlet end.

20. The system of claim 10 wherein the tube includes at least one curve.

\* \* \* \* \*